United States Patent [19]

Kössler

[11] 4,188,546
[45] Feb. 12, 1980

[54] HYDRAULIC TURBINE WITH VERTICAL AXIS

[76] Inventor: Erich Kössler, Tauberstrasse 2, A-3151 St. Pölten - St. Georgen, Austria

[21] Appl. No.: 825,780

[22] Filed: Aug. 18, 1977

[51] Int. Cl.² ............................................. H02K 7/18
[52] U.S. Cl. ....................................... 290/52; 60/364; 290/54
[58] Field of Search .................... 290/54, 51, 52, 40 R, 290/40 A, 40 B, 40 C, 40 D, 40 E, 40 F; 415/500; 418/40; 60/364, 365, 366; 137/47; 322/38

[56] References Cited

U.S. PATENT DOCUMENTS

| 1,814,631 | 7/1931 | Ray ......................................... 137/47 |
| 2,792,505 | 5/1957 | Baudry ..................................... 290/52 |
| 3,447,473 | 6/1969 | Hartland et al. ................. 415/500 X |

Primary Examiner—Gene Z. Rubinson
Assistant Examiner—Morris Ginsburg
Attorney, Agent, or Firm—Karl F. Ross

[57] ABSTRACT

A hydraulic (water) turbine for the generation of electrical power has a single vertical shaft upon which are mounted the turbine rotor, the flywheel, the generator rotor, the oil pump, and the power-output or turbine-speed controller. The system is free from clutches and transmissions which have hitherto been required to drive units associated with the turbine.

16 Claims, 6 Drawing Figures

HYDRAULIC TURBINE WITH VERTICAL AXIS

FIELD OF THE INVENTION

The present invention relates to a hydraulic (water) turbine and, more particularly, to a water turbine for driving an electric-current generator.

BACKGROUND OF THE INVENTION

With water turbines with small and medium outputs, for the generation of electric current, it is known to provide a turbine rotor with a driving connection to the rotor of an electric-current generator. In these systems, it has been found to be advantageous, for economical reasons, to provide the water turbine and the electric-current generator above one another and to form the water turbine with a vertical shaft.

In one embodiment of such construction, the turbine has a rotor which is rotatable about a vertical axis along which the turbine shaft extends, the turbine shaft being journaled in a pair of spaced-apart bearings. A flywheel is mounted upon this shaft.

A controller for regulating the output of the unit is connected to the shaft by bevel gearing, i.e. a transmission providing a power takeoff from the main shaft in a direction transverse thereto. A series-connected generator can be coupled to the unit by a clutch. This construction has been found to be effective for capacities of up to 100 metric horsepower.

In another embodiment of a vertical-axis turbine, the turbine rotor is carried by an extended portion of the generator shaft. This arrangement has been found to be satisfactory only for direct-current machines and, indeed, only for machines with low outputs and manual control. Such units have been suitable for the generation of electric power of up to about 10 kw.

In yet another conventional embodiment, the turbine rotor, a flywheel and the rotor of the generator are provided upon a single vertical shaft. This latter configuration, as with the constructions discussed earlier, have even no power or turbine speed control possibilities, or where such possibilities are afforded, take up considerable space both as to the height of the unit and as to its horizontal dimensions. The capital cost of such machines is high, especially since a separate drive and transmission must be provided for a controller which draws power from the main shaft and diverts it away from the main shaft.

Systems which use gear-transmissions for operating one or another of the devices associated with a turbine generating unit also require special bearing arrangement for the additional shafts and have been found to be satisfactory only for small outputs and minimum control variations. In many cases control precision is difficult to achieve with such systems.

In practice it has been found that such systems cannot be scaled up to large/moderate outputs without creating additional problems. In such larger scale units the need for control and for precision in any control which is carried out is paramount. This is especially the case when the turbine-generator unit is to be used for supplying municipalities with electric power. Control precision is also a factor where the electric power to be supplied is to provide energy for television transmissions, switching systems and the like where fluctuations in the demand occur rapidly.

On the other hand, it is important that the turbine-generator unit be relatively compact and reliable, having a minimum number of parts and maximum facility for repair or service. The presence of transmissions, clutches and the like sharply increases the need for maintenance, the number of service calls and the requirements for monitoring the operation of the unit.

OBJECT OF THE INVENTION

It is the principal object of the present invention to provide a water-turbine system for the generation of electric power whereby the aforedescribed disadvantages are obviated and which is relatively compact and inexpensive, is of greater reliability than earlier units, has a reduced number of parts, and is particularly suitable for controlled operations at high and moderate outputs.

Yet another object of this invention is to provide a hydraulic turbine-generator set having a vertical axis which occupies a minimum space and has low operating costs while affording the possibility of precise output control.

SUMMARY OF THE INVENTION

These objects and others which will become apparent hereinafter are attained, in accordance with the present invention, by providing along a throughgoing rigid shaft, the turbine rotor, the flywheel, the generator rotor and the oil pump for control of the output as well as the controller which effects control of the turbine speed and hence this output. Since all of the driven elements of the system are thus directly connected to a single shaft, no separate power takeoff is required for the drive of the controller.

The system of the present invention is thus free from transmissions, thereby bringing about a saving in capital costs and reducing costs which would be involved in maintenance and repair of such transmissions. Since no separate direction-change drive for the controller is necessary and, thus no special transmission is provided, the overall height of the unit can be held small. The control is effected in accordance with the invention with an oil pump. The oil pump requires little space and can be formed directly upon the turbine shaft, the oil pump output being a function of the speed of the shaft and serving as the input to the controller which can regulate the pitch of the turbine vane to maintain the desired output also hydraulically. The advantage of the oil pump is further that it is easily accessible and can be used with a reservoir which is likewise easily accessible for filling. This has been found to be the case especially where the oil pump is disposed at the upper end of the generator and the generator is disposed, in turn, above the rotor of the turbine.

According to a further feature of the invention, the oil reservoir for feeding the oil pump is also disposed above the generator, thereby allowing ready access to the reservoir. The oil pump and the reservoir can form a unit which as such is mounted upon the generator and can occupy minimum space.

The oil reservoir disposed upon the generator, in accordance with the present invention, is externally vaned or ribbed to increase its heat-dissipation surface area, the ribbed reservoir being spacedly enclosed in a jacket for guiding air past the reservoir into the air intakes of the generator at the upper end thereof. Thus, as the cooling air is induced to flow through the generator, it passes over the ribbed exterior of the reservoir to cool the oil. The constant oil cooling is thus obtained and, since the pump housing can be provided in the air stream, this housing can be cooled as well.

According to yet another feature of the invention, the upright generator housing is provided with a switchboard for control of the unit whereby the control pulses form a sensor which can be provided directly upon the shaft, serve as an input to the controlling element which modifies the orientation of the turbine vanes. The directly-driven oil pump has the advantage, over a pump driven by transmission, that upon switchoff of the unit, e.g. safety cutoff, the flywheel continues its rotation and provides the power necessary for control and emergency cutoff as well as continuous oil flow.

A servomotor with a servovalve and a hand pump can be provided, according to the invention, in the region of the control device of the turbine for producing the desired oil pressure before startup of the turbine. The necessary connections between the oil pump, oil control unit or control pulse generator and switching elements can be effected by hydraulic and electrical lines. The generator is preferable an alternating current (rotary-field) generator. Naturally, other types of generators can also be used. For example, series generators can be employed, in which case the generator can have a prolonged drive shaft to receive the turbine rotor, an enlarged generator housing to receive the flywheel between the generator and the turbine, a reinforced cover and correspondingly reinforced bearings to take up the turbine and flywheel loading, in a free upper shaft and for connection to the oil pump and the tachometer which generates the control pulses or provides the control signal.

The oil receptable can be mounted upon the reinforced upper generator cover and can surround the free shaft end and a switchboard can be mounted upon the generator housing and can be provided with the electronic control elements. In addition, the switchboard can be provided with the electrical device necessary for monitoring and controlling the generator voltage.

In prior small turbines, the turbine force, such as the weight of the turbine, the weight of the rotor of the generator, the control and journaling forces which are applied to the lower portion of the turbine, are supported upon the intake scroll or spiral of the hydraulic turbine.

This solution is effective only with turbine-generator sets of small output in which the weight of the complete unit is not high. Compact turbines of great output, however, cannot be so constructed under conventional teachings since danger arises that the intake scroll will be distorted by the externally applied forces.

This disadvantage is overcome, in accordance with another aspect of the invention, wherein the intake scroll is externally formed with support feet which take up the axial and bearing forces and transmit these forces to a foundation or support.

Thus the wall thickness of the intake scroll can be independent of the static-support requirements of the massive rotor and other parts of the turbine-generator set.

The intake scroll is formed inwardly of the support feet and is required to carry no external forces and thus the construction of the intake scroll, the wall thickness and dimensions thereof are independent of the weight of the generator rotor and the turbine.

In this case, the intake scroll need only be as thick as is necessary to absorb the forces applied thereto by the incoming water. Where necessary, the forces applied by the water to the intake scroll can also be transmitted to the foundation through the aforementioned support feet.

The support feet can, in the case of a cast housing, be constituted as cast ribs.

Preferably, with welded intake scrolls, the support feet are welded to the scroll structure and are constituted as hollow sheet metal bodies. It has been found to be especially effective to embed the sheet metal bodies in concrete or to fill them with concrete, the result being an extraordinarily high strength, stiffness and force-transmitting capability so that large forces can be transmitted to the foundation without stressing the intake scroll.

The concreting of the sheet metal structures forming the support feet, which can take place at the erection site upon emplacement of the turbine-generator set, eliminates the need to transport structural support material for the turbine and hence reduces the transport weight by a comparison with systems which must be fully structured before being delivered to the erection site.

The concreting of the support feet makes the mass of the latter so great that excellent vibration damping is ensured.

It has been found to be advantageous, moreover, to connect the support feet rigidly with the intake scroll to reinforce and stiffen the latter. A connection between the support feet and the intake scroll can be effected by welding, riveting, bolting or the like.

The stiffening of the intake scroll by the use of the support feet of the present invention permits the intake scroll to be operated with higher forces and hence higher throughput.

The intake scroll can be structurally light and, in spite of a relatively small thickness, can have the necessary stiffness.

It has been found to be advantageous to provide four such support feet. However, as long as the support feet are angularly equispaced about the axis of the turbine and the intake scroll, a less number of support feet can be provided. A suitable lesser number is three according to the present invention. Naturally, more than four support feet can be provided if desired.

According to a further feature of the invention, the support feet are connected at their upper sides with a supporting annular flange upon which the turbine, the generator and other structures are mounted and inset, the weight of the generator rotor, of the turbine rotor and the journaling or support forces are thus taken up by this ring.

As a result, a complete support structure is provided for the generator and the turbine and loading of the intake scroll is precluded.

According to still another feature of the invention, the region of the smallest height of the intake scroll is free from such a support foot to provide a space for the actuator for the control ring for adjusting the blades of the turbine rotor. The control element can be a conventional control lever as described.

In this region in which the height of the intake scroll is smaller than in regions of larger height, a space is provided, by the absence of a support foot, into which the control lever extends. It is thus not necessary to provide additional height for the unit to accommodate the control lever. The generator can be held compact because of this relationship.

It is yet another feature of the invention that the control lever is actuated by a control mechanism, such as a control cylinder, control transmission or the like which is so constructed and arranged that the control forces are conducted to a support foot. Here again, the intake scroll remains free from loading by the control forces.

BRIEF DESCRIPTION OF THE DRAWING

The above and other objects, features and advantages of the present invention will become more readily apparent from the following description, reference being made to the accompanying drawing in which.

SPECIFIC DESCRIPTION

In the following description, the water turbine can be of the type described and illustrated at page 9-208 of MARK'S MECHANICAL ENGINEERS' HANDBOOK, MCGRAW-HILL BOOK CO., NEW YORK 1958. The speed regulator can be of the type described at page 9-225 thereof and can be supplied by the oil pump and an electric pulse generator or the flywheel-type governor can be provided as the controlled element.

Figure 1:
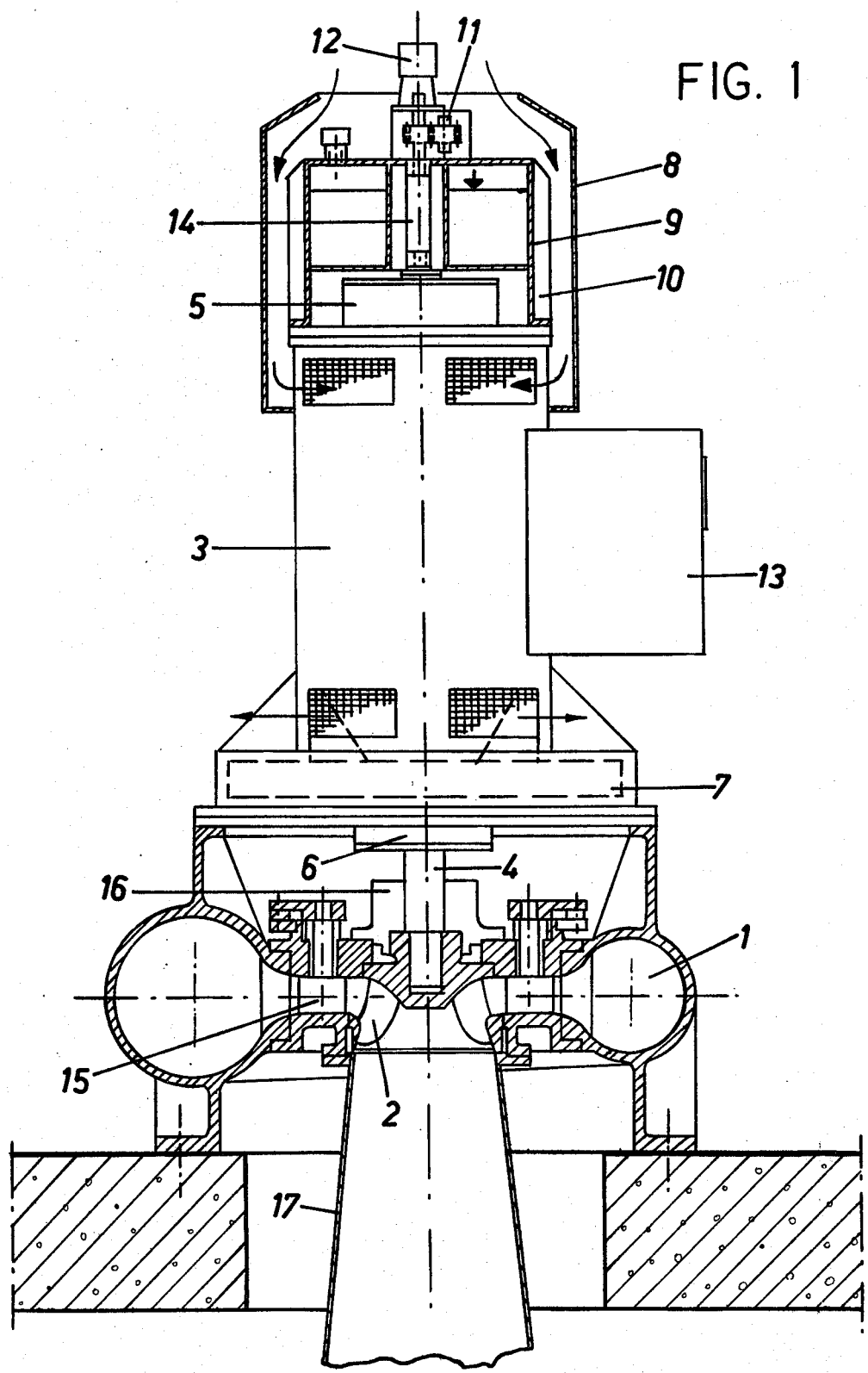
FIG. 1 is a vertical cross-sectional view in diagrammatic form, illustrating a turbine-generator set according to the invention.

In FIG. 1 of the drawing there is shown a single throughgoing shaft 4 which carries, within the turbine housing 1, a turbine rotor 2 at the lower end of the shaft. Directly above the turbine housing there is provided, upon this shaft 4, the flywheel 7 which is enclosed between the lower portion of the housing of a generator 3 whose rotor is carried upon the shaft 4 above the flywheel. Above the generator 3 and at a free end of the shaft 4 projecting upwardly therefrom, there is provided the oil pump 11 which is of the gear type and the tachometer or controller 12. The oil pump 11 is thus disposed above the generator.

Upon the generator is mounted an oil reservoir 9 which surrounds the oil pump 11 and is formed with externally projecting ribs or vanes 10.

An air-grade jacket 8 is connected to the generator housing and clutches with the generator cooling air intake in the usual manner. This guide 8 surrounds the reservoir 9 so that the cooling air is passed along the vanes 10 and simultaneously cools the oil-pump container.

A switchboard 13 is mounted laterally upon the generator and carries the necessary control elements for regulating the speed of the turbine with an input from the speed-governor or tachometer 12. The oil supplies the pressure necessary for varying, via corresponding servomotors, the vane positions or gate cross section of the turbine to regulate the water throughput.

In the embodiments described below, parts which are similar to those of FIG. 1 have been identified by the same reference numerals, followed by an appropriate letter.

Figure 2:
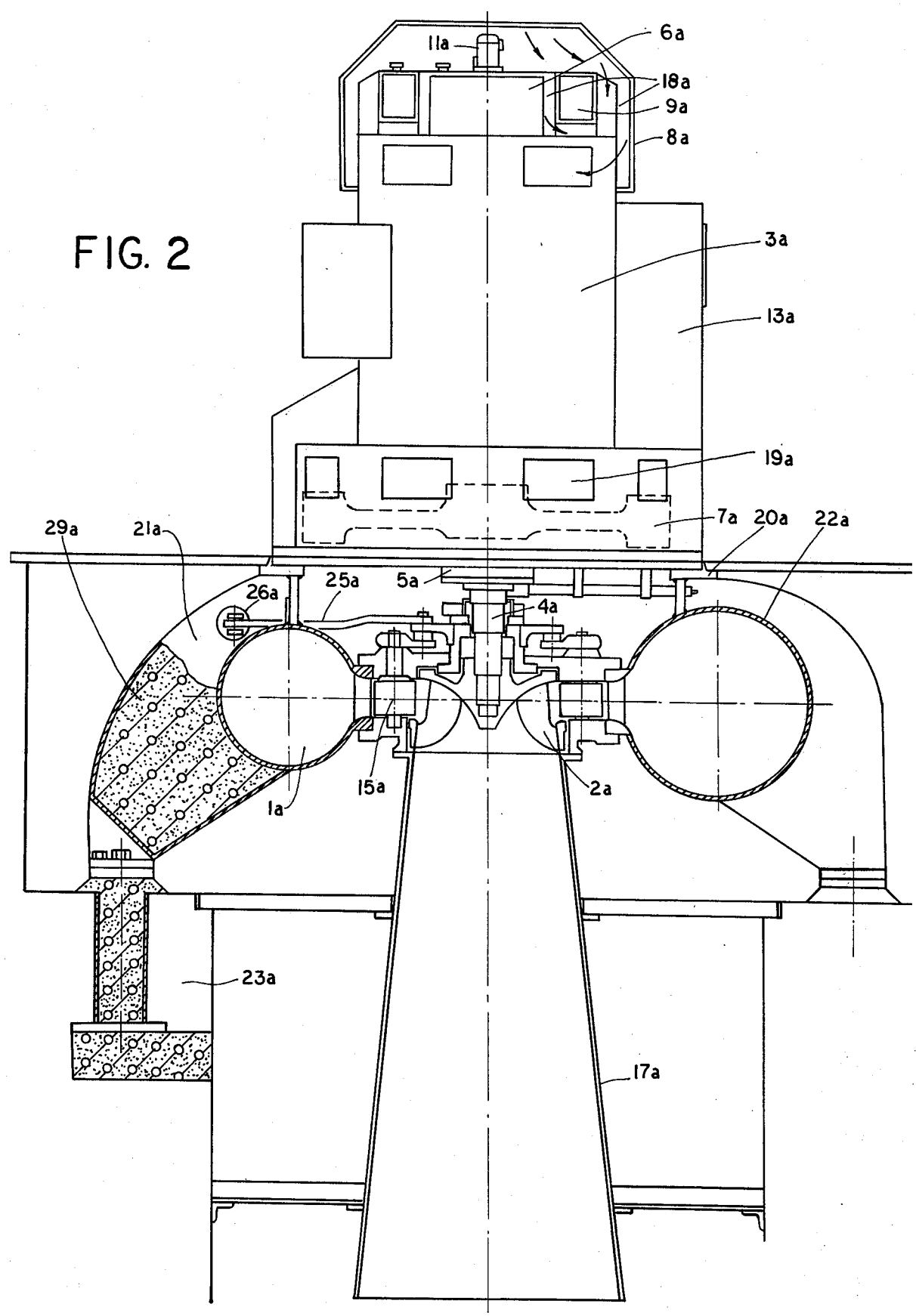
FIG. 2 is a vertical side-elevational view illustrating another embodiment of the invention, partly broken away.

In the embodiment of FIG. 2 the turbine vanes 15a of the turbine rotor 2a are shiftable about respective pivots to vary the throughput. These vanes are exposed to water traversing the intake scroll 1a.

The shaft 4a is journaled in an upper turbine bearing 6a and in a lower turbine bearing 5a. Around the upper turbine bearing 6a, in order to reduce the required height of the unit, there is provided the oil reservoir 9a for the lubricating pump 11a.

The lubricating pump 11a is disposed in the path of an air stream conducted around the oil reservoir and through air guide slits 18a and into the intake ports of the generator 3a. The air discharged through the slits 19a of the generator.

Beneath the generator 3a, upon the shaft 4a, there is affixed the flywheel 7a.

Control is effected, as previously stated, in response to the output frequency so as to maintain the output frequency constant, via a switchboard 13a disposed laterally of the housing.

From the blades or vanes 15a the water passes into a discharge funnel 17a.

The generator, including the turbine rotor, the aforementioned shaft, the bearings and all other parts are fixed to an annular supporting flange 20a which, in turn, is supported against a foundation, by four supporting feet 21a. Each of the supporting feet 21a extends through a recess of the intake scroll to transfer the forces directly to the foundation 23a.

The forced transmission is thus effected by the support feet without loading or stressing the intake scroll 1a which itself is supported by the feet 21a and is relieved from force thereby.

Figure 3:
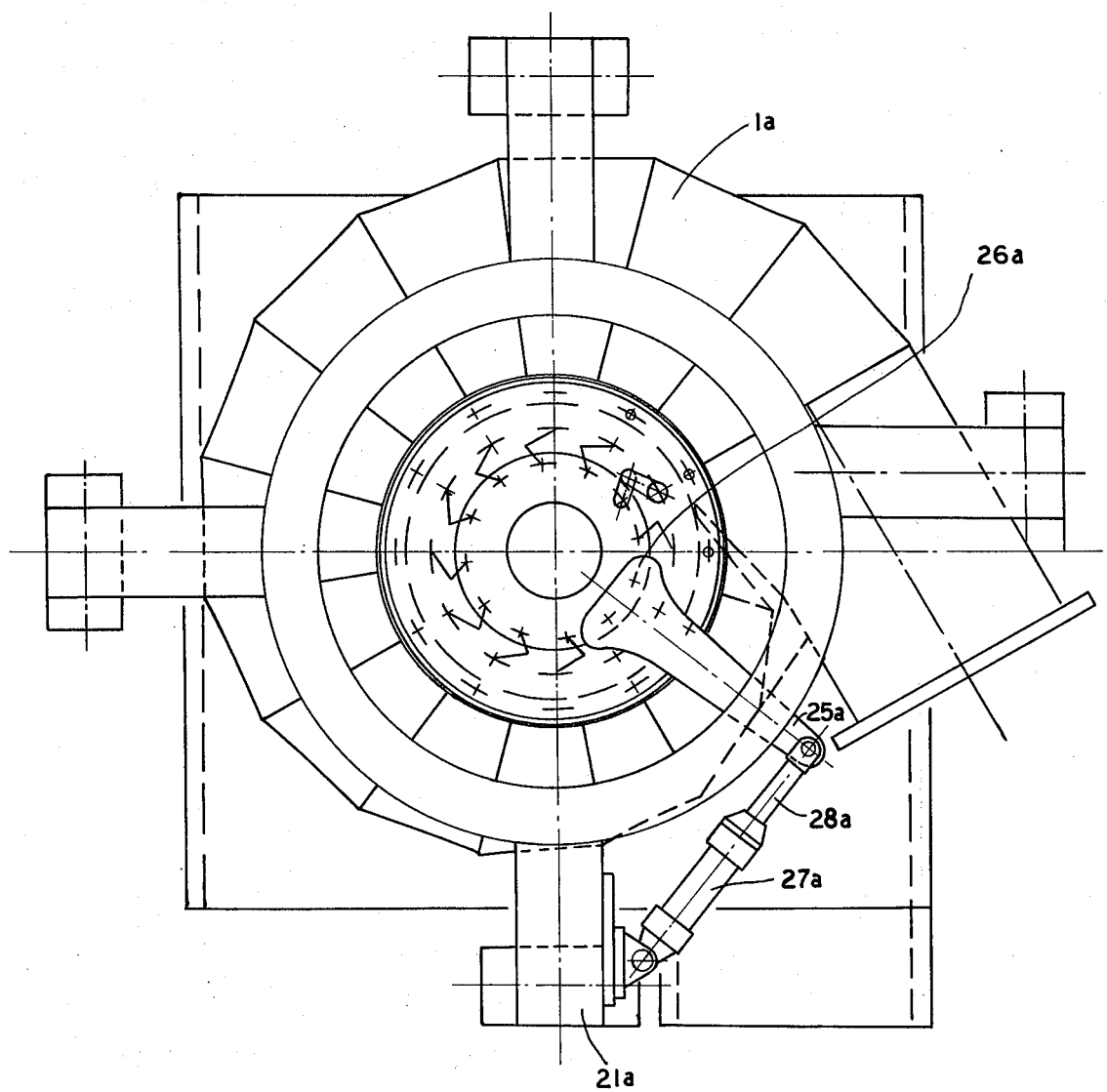
FIG. 3 is a top plan view of a Kaplan-spiral turbine of compact construction according to the invention.

The support feet 21a as shown in FIGS. 2 and 3, may each consist of a hollow box of sheet metal which can be filled with concrete 29a and thereby stiffened. The weld seams affixing the box to the intake scroll stiffen and reinforce the latter.

An actuating lever for regulating the position of the control ring 26a has been shown at 25a and displaces the vanes or blades 15a to adjust the throughput of the turbine. This lever is disposed above the intake scroll 1a in the region of the smallest diameter thereof between the support feet 21a and the annular support flange 20a. A control cylinder 27a for actuating this lever 25a is supported directly upon one of the feet 21a via a control rod 28a so that the control force is directly taken up by a support foot.

Figure 4:
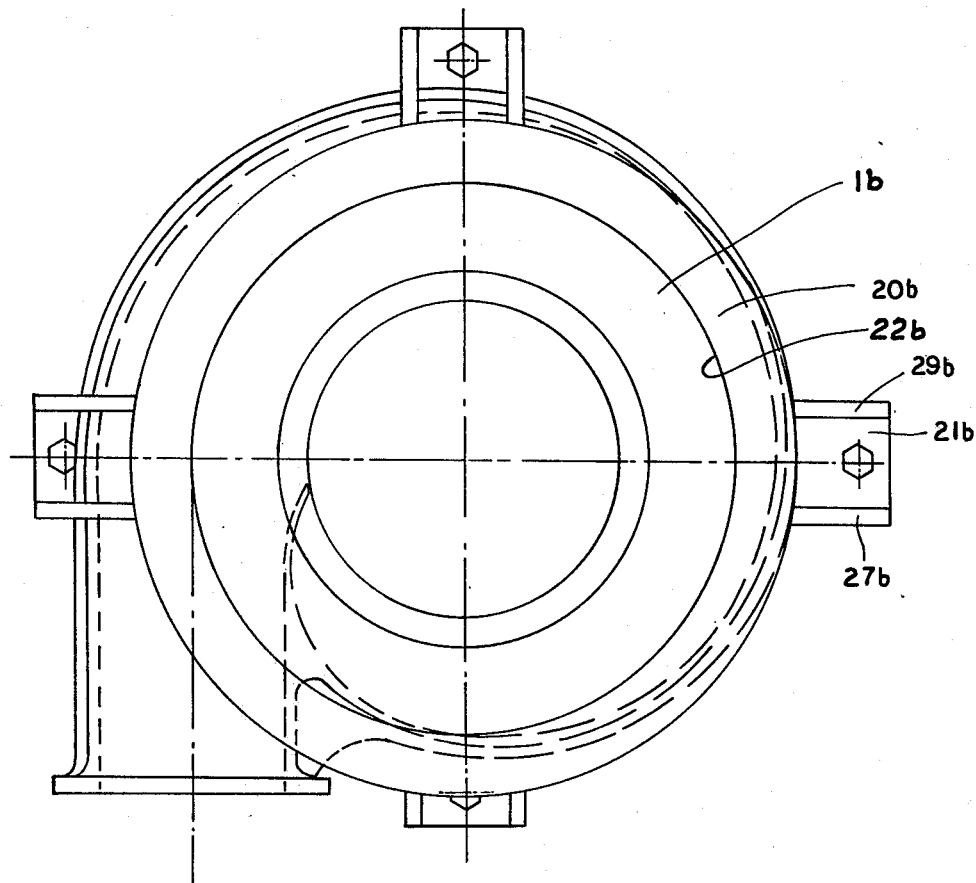
FIG. 4 is a top plan view illustrating the construction of a cast scroll according to the invention.
Figure 5:
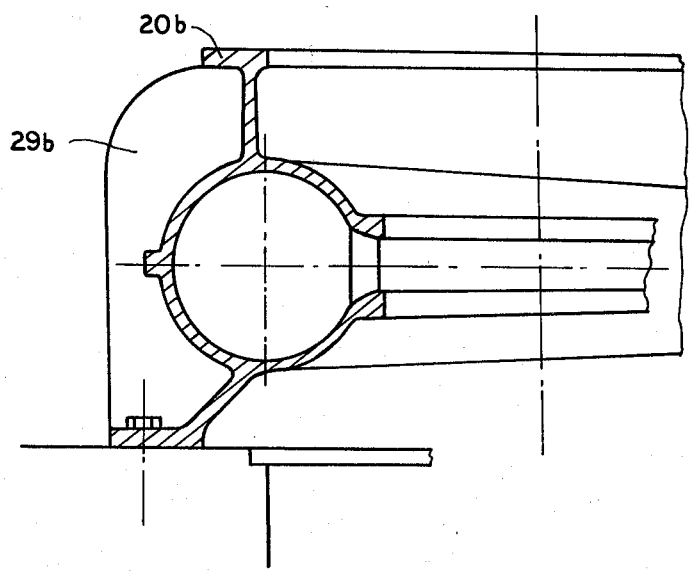
FIG. 5 is a vertical section, partly in elevation, illustrating the foot arrangement according to the invention.
Figure 6:
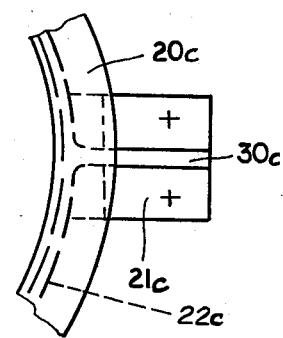
FIG. 6 is a plan view illustrating a variant, fragmentarily, of the invention.

The variants shown in FIGS. 4 and 5 provide a cast intake worm 1b with cast unitarily support feet 21b and support ring 22b (with flange 20b), with two ribs 29b. In the embodiment of FIG. 6, the support foot 21c (with flange 20c) of the ring 22c has only a single rib 30c. This latter construction is particularly suitable for light-weight generator units.

Naturally, the invention is not limited to the single embodiment illustrated and includes all structures within the spirit and scope of the invention as defined by the appended claims.

I claim:

1. A water turbine-generator set for the generation of electrical power, comprising:
   a vertical rigid shaft;

a water turbine disposed at the lower end of said shaft and having a turbine rotor connected thereto;

a flywheel connected directly to said shaft above said rotor;

an electric current generator surrounding said shaft and connected thereto above said flywheel, said generator having a generator rotor;

an oil pump connected directly to said shaft for supplying oil under pressure to regulate the output of said set; and a speed control for said turbine connected directly to said shaft, said oil pump being disposed on said shaft above said generator, an intake scroll surrounding said water turbine; and a plurality of support feet mounted on a foundation and supporting said shaft, said turbine and the rotor of said generator.

2. The water turbine-generator set defined in claim 1, further comprising an oil reservoir for said oil pump disposed on said generator at an upper end thereof.

3. The water turbine-generator set defined in claim 2 wherein said reservoir surrounds said oil pump.

4. The water turbine-generator set defined in claim 3 wherein said control is disposed on said shaft above said oil pump.

5. The water turbine-generator set defined in claim 4 wherein said reservoir is formed with outwardly projecting cooling ribs.

6. The water turbine-generator set defined in claim 5, further comprising a jacket for conducting cooling air to said generator, said jacket surrounding said reservoir and guiding said cooling air along said ribs.

7. The water turbine-generator set defined in claim 6, further comprising a switchboard mounted on said generator and provided with control means connected with said control for regulating the speed of said turbine.

8. The water turbine-generator set defined in claim 1 wherein said shaft is provided with at least one bearing, said feet supporting said bearing to relieve said scroll of the weight of said turbine and said rotor.

9. The water turbine-generator set defined in claim 1 wherein said feet are cast ribs formed on said scroll.

10. The water turbine-generator set defined in claim 1 wherein said feet are hollow bodies formed from sheet metal secured to said scroll.

11. The water turbine-generator set defined in claim 10 further comprising concrete embedding said bodies.

12. The water turbine-generator set defined in claim 1 wherein at least three such feet are provided in angularly equispaced relationship.

13. The water turbine-generator set defined in claim 12 wherein four such feet are provided.

14. The water turbine-generator set defined in claim 12 wherein an annular support flange is carried by said feet and supports said turbine and said generator while taking up the bearing forces thereof.

15. The water turbine-generator set defined in claim 1 wherein said turbine has controllable vanes provided with a control ring, a lever for actuating said ring, said lever being disposed in a space between said feet.

16. The water turbine-generator set defined in claim 15 further comprising a control mechanism connected to said lever and bearing upon one of said feet for applying control force thereto.

* * * * *